(12) United States Patent
Oztaskent et al.

(10) Patent No.: US 11,941,041 B2
(45) Date of Patent: *Mar. 26, 2024

(54) METHODS, SYSTEMS, AND MEDIA FOR PRESENTING NEWS ITEMS CORRESPONDING TO MEDIA CONTENT

(71) Applicant: Google LLC, Mountain View, CA (US)

(72) Inventors: Ant Oztaskent, London (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,355

(22) Filed: Jun. 8, 2020

(65) Prior Publication Data

US 2020/0301958 A1 Sep. 24, 2020

Related U.S. Application Data

(63) Continuation of application No. 15/399,483, filed on Jan. 5, 2017, now Pat. No. 10,678,840, which is a
(Continued)

(51) Int. Cl.
*H04N 21/439* (2011.01)
*G06F 7/08* (2006.01)
(Continued)

(52) U.S. Cl.
CPC .............. *G06F 16/438* (2019.01); *G06F 7/08* (2013.01); *G06F 16/433* (2019.01); *G06F 16/48* (2019.01);
(Continued)

(58) Field of Classification Search
CPC ............ H04N 21/8456; H04N 21/8358; H04N 21/8133; H04N 21/4884; H04N 21/4394;
(Continued)

(56) References Cited

U.S. PATENT DOCUMENTS 7,693,907 B1   4/2010 Lee et al.
7,739,254 B1 * 6/2010 Osinga .................. G06F 16/958
                                                707/750
(Continued)

OTHER PUBLICATIONS

Notice of Allowance dated Jan. 31, 2020 in U.S. Appl. No. 15/399,483.
(Continued)

*Primary Examiner* — Kyu Chae
(74) *Attorney, Agent, or Firm* — Brake Hughes Bellermann LLP

(57) ABSTRACT

Methods, systems, and media for presenting news items corresponding to media content are provided. In some implementations, the method comprises: determining a channel that is providing a television program; determining whether news content corresponding to the channel exists, wherein the determining further comprises: obtaining news documents, determining keywords associated with the news documents based on frequency, receiving captioning content corresponding to the channel, determining whether at least one of the keywords associated with the news documents is included in the captioning content, selecting a news document in response to determining that keywords associated with the news document are included in the captioning content, and obtaining one or more news items that correspond to the news document; and causing the one or more news items relating to the television program to be presented.

19 Claims, 8 Drawing Sheets

Related U.S. Application Data continuation of application No. 14/103,292, filed on Dec. 11, 2013, now Pat. No. 9,544,650.

(60) Provisional application No. 61/868,001, filed on Aug. 20, 2013.

(51) Int. Cl.

| | | |
|---|---|---|
| *G06F 16/432* | (2019.01) | |
| *G06F 16/438* | (2019.01) | |
| *G06F 16/48* | (2019.01) | |
| *G06F 16/783* | (2019.01) | |
| *H04N 21/2389* | (2011.01) | |
| *H04N 21/431* | (2011.01) | |
| *H04N 21/488* | (2011.01) | |
| *H04N 21/81* | (2011.01) | |
| *H04N 21/8358* | (2011.01) | |
| *H04N 21/8405* | (2011.01) | |
| *H04N 21/845* | (2011.01) | |
| *G06F 16/78* | (2019.01) | |

(52) U.S. Cl.
CPC ... *G06F 16/7844* (2019.01); *H04N 21/23892* (2013.01); *H04N 21/4316* (2013.01); *H04N 21/4394* (2013.01); *H04N 21/4884* (2013.01); *H04N 21/8133* (2013.01); *H04N 21/8358* (2013.01); *H04N 21/8405* (2013.01); *H04N 21/8456* (2013.01); *G06F 16/78* (2019.01)

(58) Field of Classification Search
CPC ............ H04N 21/8405; H04N 21/4722; G06F 17/3005; G06F 17/30038; G06F 17/30026
See application file for complete search history.

(56) References Cited

U.S. PATENT DOCUMENTS

| | | | |
|---|---|---|---|
| 8,115,869 B2* | 2/2012 | Rathod | H04N 21/4348 348/461 |
| 8,566,722 B2* | 10/2013 | Gordon | H04N 21/23617 715/845 |
| 2004/0031061 A1 | 2/2004 | McCalla et al. | |
| 2006/0047701 A1 | 3/2006 | Maybury et al. | |
| 2007/0214488 A1* | 9/2007 | Nguyen | G06F 16/78 725/135 |
| 2008/0028074 A1 | 1/2008 | Ludvig | |
| 2009/0288118 A1* | 11/2009 | Chang | H04N 21/4756 725/46 |
| 2011/0247042 A1 | 10/2011 | Mallinson | |
| 2011/0289098 A1 | 11/2011 | Oztaskent et al. | |
| 2011/0320429 A1* | 12/2011 | Doig | G06F 16/972 707/711 |

OTHER PUBLICATIONS

Notice of Allowance dated Sep. 1, 2016 in U.S. Appl. No. 14/103,292.
Office Action dated Apr. 2, 2018 in U.S. Appl. No. 15/399,483.
Office Action dated Apr. 17, 2015 in U.S. Appl. No. 14/103,292.
Office Action dated May 20, 2016 in U.S. Appl. No. 14/103,292.
Office Action dated Jun. 5, 2019 in U.S. Appl. No. 15/399,483.
Office Action dated Sep. 21, 2015 in U.S. Appl. No. 14/103,292.
Office Action dated Oct. 9, 2019 in U.S. Appl. No. 15/399,483.
Office Action dated Oct. 16, 2018 in U.S. Appl. No. 15/399,483.

* cited by examiner

US 11,941,041 B2

METHODS, SYSTEMS, AND MEDIA FOR PRESENTING NEWS ITEMS CORRESPONDING TO MEDIA CONTENT

CROSS-REFERENCE TO RELATED APPLICATIONS

This application is a continuation of U.S. patent application Ser. No. 15/399,483, filed Jan. 5, 2017, which is a continuation of U.S. patent application Ser. No. 14/103,292, filed Dec. 11, 2013, which claims the benefit of U.S. Provisional Patent Application No. 61/868,001, filed Aug. 20, 2013, each of which is hereby incorporated by reference herein in its entirety.

TECHNICAL FIELD

The disclosed subject matter relates to methods, systems, and media for presenting news items corresponding to media content.

BACKGROUND

While watching a television program, a viewer is often interested in information relating to the television program. For example, the viewer may want to search for additional information about a topic that is shown in a television program.

Search engines allow the viewer to search on the Internet for resources, which include webpages, images, video content, and audio content. A typical search engine provides a web page for entering search terms, where the search terms are inputted by the viewer. Search results conducted for particular search terms are provided to the viewer. Moreover, with the advent of mobile devices, the use of mobile search engines has increased. For example, using a mobile device, the viewer may perform a search and browse through Internet content while watching the television program.

Text-based search engines, however, may be somewhat limited for this user. In an example where the user wants to find a full news article similar to that which is being discussed on a television program, the user may attempt to obtain this information by entering one or more keywords into a mobile search engine. The user then clicks through search results to find a webpage containing information relating to the news story. This can be a time consuming procedure for the user. Moreover, this can cause the user to miss a substantial portion of the television program or cause the user to pause the television program to obtain such information via this procedure.

Accordingly, mechanisms for presenting news items corresponding to media content are provided.

SUMMARY

Methods, systems, and media for presenting news items corresponding to media content are provided. In accordance with some implementations of the disclosed subject matter, a method for providing information relating to media content, the method comprising: determining, using a hardware processor, a channel that is providing a television program; determining, using the hardware processor, whether news content corresponding to the channel exists, wherein the determining further comprises: obtaining a plurality of news documents; determining a plurality of keywords associated with the plurality of news documents based on frequency; receiving captioning content corresponding to the channel; determining whether at least one of the plurality of keywords associated with the plurality of news documents is included in the captioning content; selecting a news document in response to determining that keywords associated with the news document are included in the captioning content; and obtaining one or more news items that correspond to the news document; and causing, using the hardware processor, the one or more news items relating to the television program to be presented.

In accordance with some implementations of the disclosed subject matter, a system for providing information relating to media content is provided, the system comprising: a hardware processor that is configured to: determine a channel that is providing a television program; determine whether news content corresponding to the channel exists, wherein the hardware processor is further configured to: obtain a plurality of news documents; determine a plurality of keywords associated with the plurality of news documents based on frequency; receive captioning content corresponding to the channel; determine whether at least one of the plurality of keywords associated with the plurality of news documents is included in the captioning content; select a news document in response to determining that keywords associated with the news document are included in the captioning content; and obtain one or more news items that correspond to the news document; and cause the one or more news items relating to the television program to be presented.

In accordance with some implementations of the disclosed subject matter, a non-transitory computer-readable medium containing computer executable instructions that, when executed by a processor, cause the processor to perform a method for providing information relating to media content is provided. The method comprising: providing information relating to media content, the method comprising: determining, using a hardware processor, a channel that is providing a television program; determining, using the hardware processor, whether news content corresponding to the channel exists, wherein the determining further comprises: obtaining a plurality of news documents; determining a plurality of keywords associated with the plurality of news documents based on frequency; receiving captioning content corresponding to the channel; determining whether at least one of the plurality of keywords associated with the plurality of news documents is included in the captioning content; selecting a news document in response to determining that keywords associated with the news document are included in the captioning content; and obtaining one or more news items that correspond to the news document; and causing, using the hardware processor, the one or more news items relating to the television program to be presented.

In accordance with some implementations of the disclosed subject matter, a system for providing information relating to media content is provided. The system comprising: means for determining a channel that is providing a television program; means for determining whether news content corresponding to the channel exists, wherein the means for determining further comprises: means for obtaining a plurality of news documents; means for determining a plurality of keywords associated with the plurality of news documents based on frequency; means for receiving captioning content corresponding to the channel; means for determining whether at least one of the plurality of keywords associated with the plurality of news documents is included in the captioning content; means for selecting a news document in response to determining that keywords associated with the news document are included in the captioning content; and means for presenting one or more news items that correspond to the news document; and means for causing, using the hardware processor, the one or more news items relating to the television program to be presented.

In some implementations, the system further comprises means for receiving an audio fingerprint of audio data corresponding to the television program from a mobile device, wherein the channel is determined based on the received audio fingerprint.

In some implementations, the system further comprises means for extracting an audio stream from each of a plurality of television channels; means for generating, for each of the plurality of television channels, at least one audio fingerprint from at least a portion of the extracted audio stream that corresponds to one of the plurality of television channels; and means for storing the at least one audio fingerprint in a database indexed by channel.

In some implementations, the system further comprises means for comparing the audio fingerprint with the at least one stored audio fingerprint; and means for identifying the channel based on the comparison.

In some implementations, the system further comprises means for determining a score for each of the plurality of keywords based on the frequency, wherein the frequency is at least one of: a term frequency and an inverse document frequency.

In some implementations, the system further comprises means for receiving additional captioning content corresponding to the channel; means for updating the captioning content associated with the channel by adding the additional captioning content and removing a portion of the captioning content; and means for determining whether the at least one of the plurality of keywords associated with the plurality of news documents is included in the updated captioning content.

In some implementations, the system further comprises means for ranking the plurality of keywords based on the frequency; means for searching for the ranked plurality of keywords in the updated captioning content; means for determining that at least a portion of the ranked plurality of keywords are found in the news document in the plurality of news document; means for determining that the news document matches the updated captioning content based on the ranked plurality of keywords found in the news document; and means for retrieving a news item that corresponds to the news document.

In some implementations, the system further comprises means for storing the news items in a timeline associated with the channel in response to determining that the news document matches the updated captioning content.

In some implementations, the system further comprises means for accessing the timeline associated with the channel in response to receiving audio data corresponding to the television program on the channel; and means for retrieving one or more news items stored in the timeline based on timing information associated with the television program.

In some implementations, the news item includes at least one of: a snippet of the news document, an image of the news document, a link to the news document, and one or more links to similar news documents related to the news document.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements

DETAILED DESCRIPTION

Figure 1:
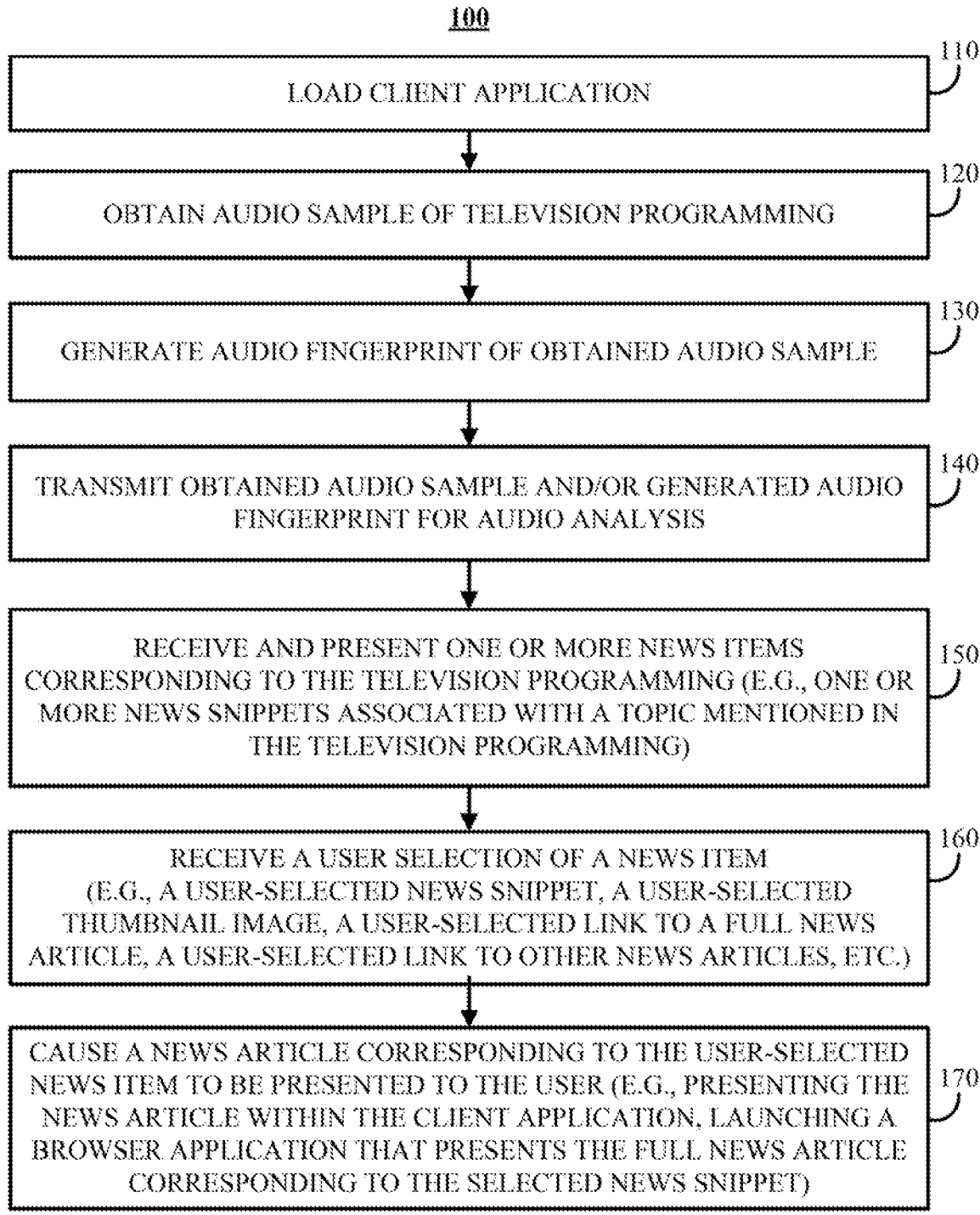
FIG. 1 shows an illustrative example of a process for presenting news items based on media content in accordance with some implementations of the disclosed subject matter.

In accordance with some implementations of the disclosed subject matter, mechanisms for presenting news items corresponding to media content are provided.

In some implementations, these mechanisms can receive audio data or any other suitable media data relating to one or more programs. For example, in response to launching a client application on a mobile device, these mechanisms can enter a channel detection mode that includes activating an audio input device (e.g., a microphone) and capturing audio data corresponding to a television program currently being presented on a display device. In a more particular example, an audio fingerprint or any other suitable digital representation can be generated from the received audio data, where the audio fingerprint can be used to identify the same or similar portions of audio data.

In response to receiving the audio data, the mechanisms can identify the channel that is providing the television program. For example, upon receiving the audio data and/or the audio fingerprint, the mechanisms can compare the audio data against other stored representations (e.g., other audio fingerprints, other audio data, etc.) to identify the channel.

It should be noted that, in some implementations, audio data may not be captured. For example, the channel detection mode can include identifying the channel by using the client application to detect the channel that a media playback device (which is connected to the mobile device) is currently tuned to. In another example, when the mobile device includes a transmitter for transmitting codes, such as infrared codes or code sequences, to a media playback device, the channel detection mode can include identifying the channel by determining the last channel that the user of the mobile device selected. In this example, when the mobile device and the user input device (e.g., a remote control) are connected via a communications network, the channel detection mode can include identifying the channel by transmitting a query to the user input device for the last channel that the user selected. In yet another example, the client application can present the user of the mobile device with a list of channels for selection. In this example, the client application can allow the user of the mobile device to indicate a particular channel that the user is watching on a media playback device (which may or may not be connected to the mobile device).

Using the channel information associated with the audio data or any other suitable program information, the mechanisms can obtain one or more news items relating to the program. For example, these mechanisms can access a timeline of news items and obtain news items corresponding to the identified channel and a time parameter (e.g., the last Z minutes). In a more particular example, these mechanisms can generate a query based on the channel information and time information that performs a search of a timeline associated with the channel to obtain corresponding news items. The news items can then be transmitted back to the client application executing on the mobile device for review and/or selection by a user of the client application. In this example, the client application can present the user with news items that correspond to news content presented by the channel within a particular time period.

It should be noted that the news item presented to the user can be any suitable representation of a piece of news content. For example, a news item can include a snippet of the news content, a thumbnail image of the news content, a link or uniform resource locator (URL) to the news content (e.g., a webpage having the full news article), one or more links or URLs to other news content about the same topic (e.g., a similar article provided by a different news source, a follow-up article, a related article, etc.).

In response to receiving a user selection of one of the news items, the mechanisms can present the news content associated with the selected news item. For example, the mechanisms can cause the news content to be presented in the client application executing on the mobile device. In another example, the mechanisms can cause a browser application executing on the mobile device to be launched and present the news content in the browser application (e.g., by accessing the URL to the news content). In yet another example, the mechanisms can allow the user to select a device to present the news content (e.g., the media playback device, a tablet device, etc.). Alternatively, the mechanisms can aggregate or cluster news content about the same story and, in response to launching the client application and receiving audio data relating to the channel, can select one of the aggregated pieces of news content (e.g., the top news article based on recency and/or based on popularity-based-on-click-through-rate) and present the selected piece of news content to the user.

It should be noted that, although the implementations described herein generally relate to providing news items corresponding to a television program, this is merely illustrative. While the television program can be live, broadcasted media content, the mechanisms can be implemented to provide news items corresponding to recorded content (e.g., stored on a digital video recorder), over-the-top content, on-demand content, etc.

These mechanisms can be used in a variety of applications. For example, these mechanisms can be used to provide a mobile device user with the opportunity to interact with media content presented on a display device. In another example, these mechanisms can be used to provide a mobile device user with additional news information associated with presented media content without entering a text-based search query into a search engine and without determining keywords for entering into such a text-based search query. In yet another example, news items, such as a snippet of news content, a thumbnail image of news content, or a link to a full news article, can be automatically presented to a user in response to launching a client application implementing the mechanisms described herein.

Turning to FIG. 1, an illustrative example 100 of a process for presenting news items based on media content is shown in accordance with some implementations of the disclosed subject matter. At 110, a computing device can load a client application that presents news items based on media content. For example, the computing device can be a mobile device (e.g., a cellular telephone, a smartphone, a tablet computing device, a wearable computing device, etc.).

It should be noted that the media content can include one or more programs (e.g., a news program, a talk show, a sports program, etc.) from various sources, such as programs broadcast over-the-air, programs broadcast by a cable television provider, programs broadcast by a telephone television provider, programs broadcast by a satellite television provider, on-demand programs, over-the-top programs, Internet content, streaming programs, recorded programs, etc.

At 120, once the client application is loaded, the client application can enter a channel detection mode, which can begin by obtaining an audio sample of the television programming currently being presented. For example, the client application can activate an audio input device coupled to the computing device, such as a microphone, where the audio input device captures and records the audio sample or any other suitable audio data associated with a presented television program. In another example, the client application can receive a user indication to store audio data for transmission to an audio matching service.

In some implementations, the client application can activate an audio input device that captures audio from its surroundings and uses appropriates filters and/or other audio enhancements to extract an audio fingerprint or filtered audio data associated with the presented television program. For example, silent portions of the audio sample can be removed to reduce the file size of the audio sample. In another example, portions of the audio sample having distortion can be removed to reduce the file size of the audio sample. In yet another example, in response to determining that at least a portion of the audio sample does not include audio data having a given quality, the client application can prompt the user of the client application to record another audio sample.

In some implementations, the client application executing on the computing device can generate an audio fingerprint of the audio sample using any suitable audio fingerprinting technique at 130. The audio fingerprint can be a digital representation generated from the received audio sample, where the audio fingerprint can be used to identify the same or similar portions of audio data. Alternatively, the client application can transmit the audio sample associated with the television program to a search system or an audio matching system that generates an audio fingerprint.

At 140, the client application can transmit the obtained audio sample and/or the audio fingerprint for analysis. For example, upon launching the client application and activating the audio input device, the client application can automatically stream the audio sample and/or the audio fingerprint to a search system that accesses a matching service (e.g., an audio fingerprint matching service). As described above, the client application can stream the audio sample to a search system, where the search system generates an audio fingerprint corresponding to the audio sample and transmits the audio fingerprint to an audio fingerprint matching service for analysis.

In some implementations, additional information can be transmitted along with the audio sample, such as client device information, user profile information, location information, user preferences, timing information, and other information that can be used to generate a search query associated with the audio sample of the television program.

It should be noted that in implementations described herein in which the client application (or other mechanisms described herein) collects information about a particular user, the user can be provided with an opportunity to control whether the client application collects information about particular users and/or how collected user information is used by the client application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the client application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the client application.

Figure 2:
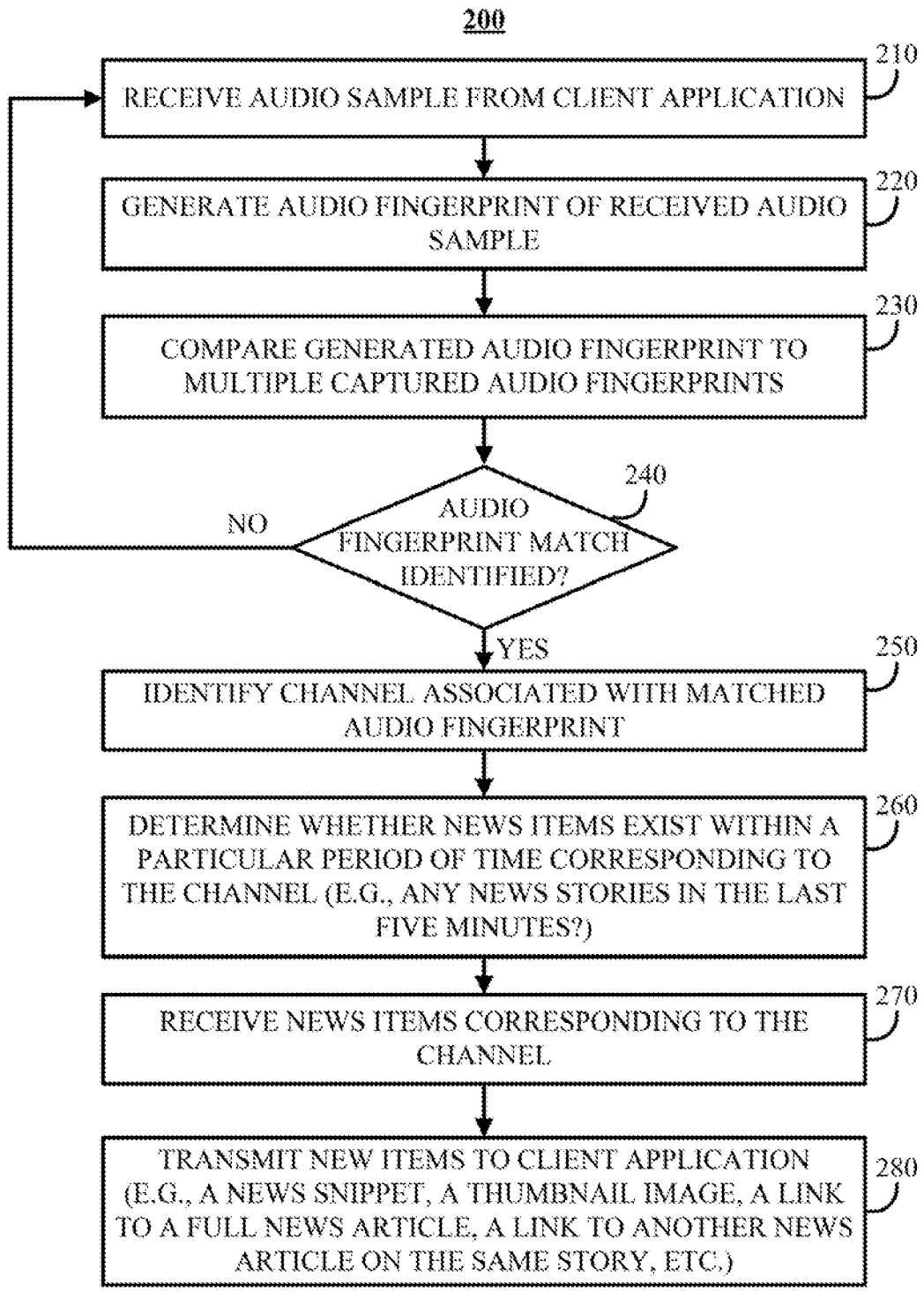
FIG. 2 shows an illustrative example of a process for determining a channel and other program information based on audio data and transmitting news items corresponding to the channel in accordance with some implementations of the disclosed subject matter.

Turning to FIG. 2, upon receiving the audio sample and/or other additional information from the client application at 210, an audio fingerprint of the received audio sample can be generated at 220. Again, the audio fingerprint can be generated by the client application or any other suitable application and transmitted to the search system or an audio fingerprint matching system for analysis.

At 230, the search system can compare the generated audio fingerprint to multiple audio fingerprints. For example, the generated audio fingerprint associated with the audio sample from the client application can be compared against a subset of stored audio fingerprints. In another example, the generated audio fingerprint associated with the audio sample from the television program can be compared against live television channel audio fingerprints that are stored and indexed by channel in a database. In a more particular example, the search system can access a database or other suitable storage device containing multiple audio fingerprints and filter the multiple audio fingerprints to a subset of audio fingerprints based on location information, user preferences, and other information received from the client application. In this example, only audio fingerprints associated with the received location information can be used to compare with the generated audio fingerprint. In another example, particular audio fingerprints from the database or storage device can be used for comparison before others, such as audio fingerprints associated with popular channels, newer audio fingerprints, audio fingerprints commonly matched, etc.

In some implementations, the search system can, for example, include capture modules that receive and process signals from multiple sources (e.g., multiple channels). These capture modules can, for each channel, capture video screenshots at particular time intervals (e.g., every two or three seconds) and/or generate audio fingerprints from audio data at particular time intervals. Generally speaking, these capture modules can monitor media content from multiple content sources and generate video screenshots, audio fingerprints, and/or any other suitable content identifier. More particularly, these capture modules can store the generated video screenshots, audio fingerprints, and other content identifiers in a storage device. For example, a capture module can monitor channels providing broadcast television content and store generated audio fingerprints in a database that is indexed by channel and time.

It should be noted that, in some implementations, generated video screenshots, audio fingerprints, and other content identifiers indexed by channel and time in a database can be discarded after a predetermined time. For example, in response to determining that a video screenshot is associated with a time outside of a particular time window, the search system or any other suitable component can remove the video screenshot from the database.

At 240, it can be determined whether a match is found. If no matching audio fingerprint is found, the search system can return to 210 and wait to receive additional audio samples from the client application. Additionally or alternatively, the search system can transmit a message to the client application requesting that the user restart the client application, transmit another audio sample, and/or input or verify particular information (e.g., program information, such as channel number, service provider information, program title, etc.).

In response to identifying an audio fingerprint match at 250, the search system can identify a channel or any other suitable content identifier associated with the matched audio fingerprint. For example, the matching audio fingerprint can be associated with a channel (e.g., Channel X) and the search system can use this association to determine that the user of client application is watching a television program provided on that channel. In another example, the search system can transmit a notification to the client application that the channel has been identified. This notification can include, for example, an indication that the search system has successfully identified the channel from the received audio sample and/or the identified channel. In some implementations, in response to the user of the client application determining that the identified channel is incorrect, the client application can provide the user with an opportunity to indicate the correct channel or transmit another audio sample.

It should be noted that, in some implementations, the client application can initiate the channel detection mode without capturing audio information or using audio fingerprints (e.g., steps 120-140 of FIG. 1 and steps 210-240 of FIG. 2).

In some implementations, the search system can include identifying a channel by detecting the channel that a media playback device (which is connected to the mobile device) is currently tuned to. For example, the search system can transmit a query to the mobile device to determine which devices are connected to the mobile device. In response to determining that a media playback device, such as a television device, a gaming device, or a set-top box, is connected to the mobile device, the search system can instruct the client application to communicate with the media playback device to determine the channel that the media playback device is currently tuned to. Alternatively, in response to determining that a user input device, such as a remote control, is connected to the mobile device, the search system can instruct the client application to communicate with the user input device to determine the last channel or previous channels that have been tuned to.

In a more particular example, the client application executing on the mobile device can include a second screen application or can communicate with a second screen application that has been installed on the mobile device. Second screen applications can, for example, allow the user of the mobile device or other second screen device to be presented with content transmitted to a media playback device, such as a television device or a set-top box. The client application can use the second screen application to determine the channel that the media playback device is presenting on the second screen device.

In another more particular example, the client application executing on the mobile can include a remote control application or can communicate with a remote control application that has been installed on the mobile device. Remote control applications can, for example, allow the mobile device to issue a command to control the media playback device (e.g., channel up, channel down, etc.) and, in response, instruct an infrared transmitter connected to the mobile device to transmit a corresponding infrared code to the media playback device. The client application can use the remote control application to determine the last channel or previous channels that have been tuned to.

In some implementations, the client application can present the user of the mobile device with a list of channels for selection. In this example, the search system can receive a particular channel or any other suitable content identifier that the user is currently watching on a media playback device (which may or may not be connected to the mobile device).

In some implementations, in response to determining the channel, the search system or any other suitable system can determine whether news items exist based on the identified channel and a given time interval at 260. For example, in response to determining the channel for a live news program, the search system can determine whether there were any news stories detected in the past Z minutes (e.g., five minutes). This can include, for example, accessing a timeline associated with the identified channel and determining whether one or more news items or any other news content identifiers have been placed on the timeline for that period of time.

The search system can receive news items or other suitable news content from the accessed database based on the identified channel and a given time interval at 270. As described above, a news item can include a snippet of the news content, a thumbnail image of the news content, a link or uniform resource locator (URL) to the news content (e.g., a webpage having the full news article), one or more links or URLs to other news content about the same topic (e.g., a similar article provided by a different news source, a follow-up article, a related article, etc.).

At 280, the news items and/or other news-related content can be transmitted to the client application for presenting to the user. For example, the news items, such as snippets of news content related to the television program that the user is currently watching, can then be transmitted back to the client application executing on the mobile device for review and/or selection by the user of the client application.

Referring back to FIG. 1, the news items corresponding to the television program can be presented to the user at 150. For example, the client application can allow the user to scroll through different news items (e.g., news snippets, URLs to full news articles, thumbnail images, etc.), where the user can scroll vertically or horizontally on the computing device. In another example, the client application can automatically present the user with a single news item that corresponds to the television programming. In this example, a news aggregation system can cluster or aggregate news content relating to the same story or topic and select a single news item from the aggregated news items based on recency or popularity (e.g., popularity based on click-through-rate, popularity based on the content source, etc.). The single news item can then be automatically presented to the user.

In response to receiving and presenting the news items to the user, the client application can allow the user to select a news item from the multiple news items at 160. For example, the client application can detect when the user has placed a highlight region over a news item and pressed a suitable button on the computing device. In another example, when the computing device is a mobile device with a touch screen, the client application can respond to contact with the touch screen, such as one or more taps on the touch screen, movement of the point of contact while maintaining continuous contact, etc.

In some implementations, in response to receiving a user selection of a news item at 160, the client application can cause a news article or any other suitable news content corresponding to the user-selected news item to be presented to the user at 170. For example, the client application can retrieve the news article or other news content associated with the selected news item and present the news article in the client application (e.g., on the display of the mobile device executing the client application). In another example, the client application can launch a browser application executing on the mobile device and instruct the browser application to load the news article. In yet another example, the client application can provide the user with an opportunity to select a device for presenting the news article (e.g., the media playback device, where the media playback device launches a browser application and accesses a webpage that provides the news article).

As described above, multiple news items can be obtained. More particularly, multiple news items, such as multiple news articles, that relate to the same or similar story or topic may be available to the user. In some implementations, these multiple news items concerning the same story can be aggregated or clustered and one or more of these news items can be selected for presenting to the user (e.g., in response to receiving an audio sample that relates to such news items).

Figure 3:
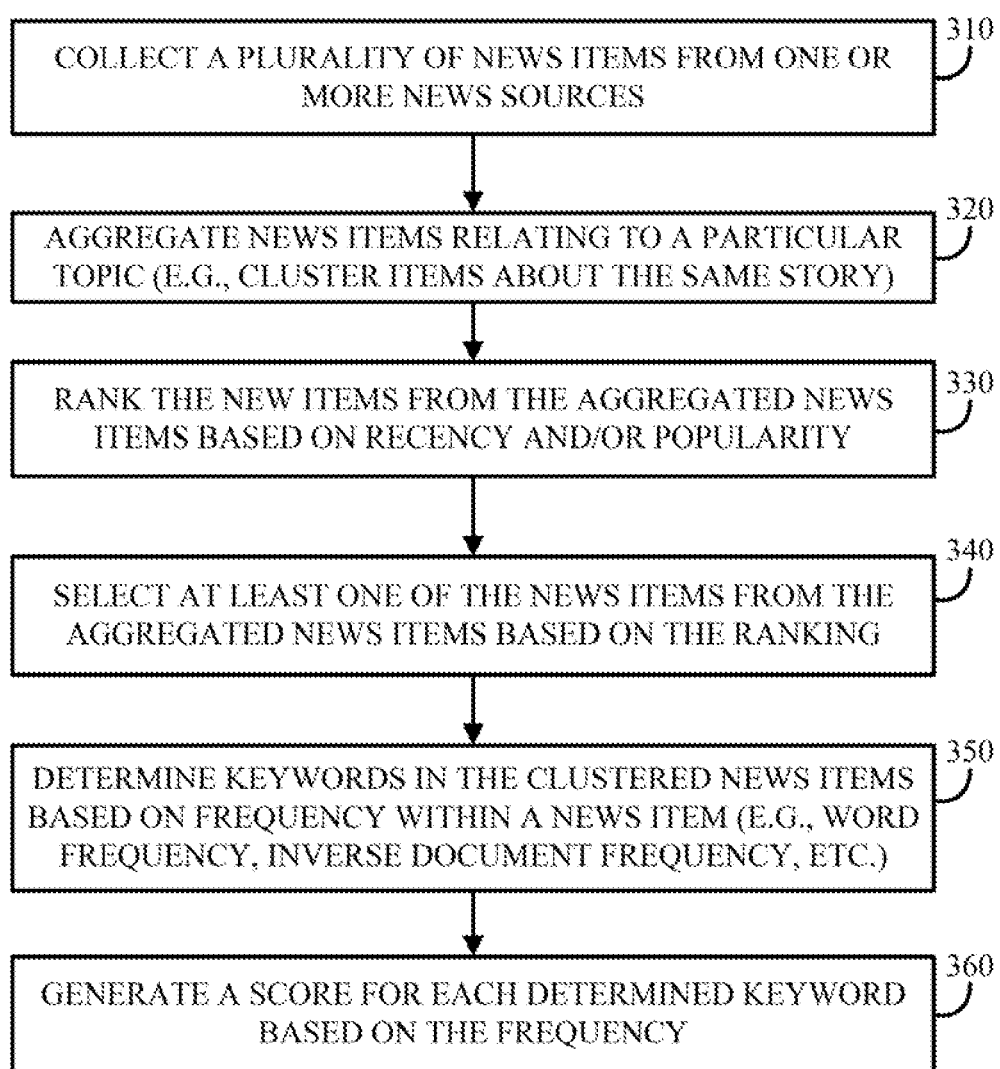
FIG. 3 shows an illustrative example of a process for aggregating news documents and determining keywords associated with the aggregated news documents based on frequency in accordance with some implementations of the disclosed subject matter.

FIG. 3 is an illustrative example 100 of a process for aggregating news documents and determining keywords associated with the news documents is shown in accordance with some implementations of the disclosed subject matter. As shown, process 300 begins by obtaining multiple news documents or other news content from one or more content sources at 310. For example, a news aggregator system or any other suitable system can continuously scan Internet content sources for news articles. In particular, a news aggregator system can crawl a corpus of news documents (e.g., webpages containing news content), index the news documents, and/or store information associated with the news documents (e.g., source information, time information, etc.). At 320, the news aggregator system can aggregate or cluster news documents that relate to a particular topic or story. For example, the news aggregator system can cluster news articles about the same story or similar stories together. In a more particular example, the news aggregator system can cluster news articles together by measuring the distance between the documents. In such an example, the news aggregator system can place an increased importance on particular terms (e.g., names of a person, place, event, and/or organization) and/or increased weighting for measuring the similarities between news documents.

In some implementations, the news aggregator system can rank the news documents from the clustered news items at 330. For example, the news aggregator system can rank each of the news documents by recency (e.g., recently published news articles, a difference between a time that the source published the news article and a time that the news event occurred, etc.). In another example, the news aggregator system can rank each of the news documents by popularity, such as popularity based on click-through-rate. In this example, the popularity of a news documents can be based on the ratio of the number of user selections of the news document to the number of times the news document is displayed. In yet another example, the news aggregator system can rank each of the news documents based on popularity or reputation of the content source (e.g., a trusted source, a news source having a high number of visitors, etc.). In response to ranking the news items, the news aggregator system can select at least one of the news documents from the clustered news documents for presenting to the user based on the ranking at 340.

In some implementations, the news aggregator system can determine one or more keywords in the clustered news documents at 350. It should be noted that there are several approaches for selecting one or more keywords from a group of clustered documents. For example, the news aggregator system can determine word or term frequency within the news document. In this example, the news aggregator system can determine a count value for each keyword, where count values can reflect which keywords occurred more often and which keywords occurred less often within a news document. In another example, the news aggregator system can determine the inverse document frequency associated with the keyword across all news documents.

In some implementations, the news aggregator system can generate a score for each keyword at 360. For example, the score can be based on word frequency within a news document and inverse document frequency across all news documents. Using these scores, the news aggregator system or any other suitable system can, for example, select particular keywords for association with clustered news documents.

In some implementations, a news matching system or any other suitable system can use the information from the news aggregator system to determine which news documents to store. For example, a news matching system can transmit a query to the news aggregator system to obtain news documents, such as clustered news articles, for a particular period of time (e.g., the last twenty-four hours). This process can be performed by the news matching system at a predetermined time (e.g., every thirty minutes). In addition, for each of the news documents obtained from the news aggregator system, the news matching system can determine, retrieve, and/or store a particular number of keywords. For example, for each of the news documents from the last twenty-four hours, the news matching system can retrieve from the news aggregator system and store the ten highest-ranking keywords based on the score generated at 360 in FIG. 3. In another example, for each of the news documents from the last twenty-four hours, the news matching system can store the ten keywords in each news documents that appear most frequently.

It should be noted that, in some implementations, the news matching system can store news documents within a particular period of time (e.g., the last twenty-four hours) in a cache or other suitable storage device. Upon a news document falling outside of the particular time window, the news matching system can remove such news documents from the cache (e.g., older news stores). It should also be noted that, in some implementations, the news matching system can retrieve news documents every M minutes from the news aggregator system from the last N hours, while the news matching system can store news documents from the last H hours (where H may or may not be equal to N). For example, the news matching system can continue to retrieve the last twenty-four hours of news content, but store the last forty-eight hours of news content. Similarly, the news matching system can store the keywords associated with the news documents that are currently stored in the cache.

As described above, the search system can obtain live television channel audio fingerprints or other suitable audio fingerprints that are stored and indexed by channel in a database. In some implementations, the search system can also obtain captioning content that is associated with the media content, such as a television program. The captioning content can include teletext data, text formatted according to the EIA-608 standard for closed captioning, text formatted according to the CEA-708 standard for closed captioning, or any other suitable type of text. In some instances, the captioning content may be provided in a video as part of one or more video frames. For example, the captioning content can include subtitles, etc. The portion of captioning content associated with an identified channel can be compared against keywords or any other suitable text associated with particular news documents. These and other features for finding matching news documents are described in connection with FIGS. 4 and 5.

Figure 4:
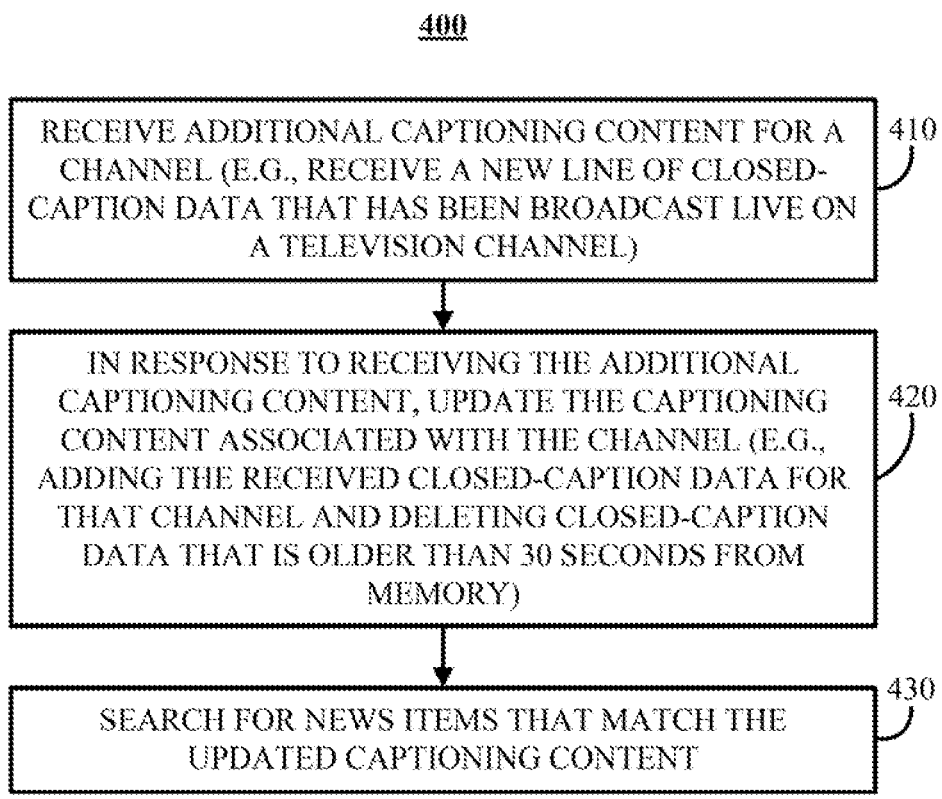
FIG. 4 shows an illustrative example of a process for updating captioning content and searching for news items that match the updated captioning content in accordance with some implementations of the disclosed subject matter.

Turning to FIG. 4, the search system can receive additional captioning content for a channel at 410. For example, for a television program that is being broadcasted live on a television channel, the search system can receive a new line of closed caption data. At 420, the search system can update the window of captioning content associated with a channel. For example, in response to receiving a new line of closed caption data, the search system can add the new line of closed caption data for that channel into captioning content that is stored in memory and can delete older closed caption data from memory, such as closed caption data that is older than thirty seconds.

Accordingly, the search system can generate a sliding window of captioning content (e.g., closed caption data) for each channel. At 430, the updated captioning content can be used to search for matching news items.

Figure 5:
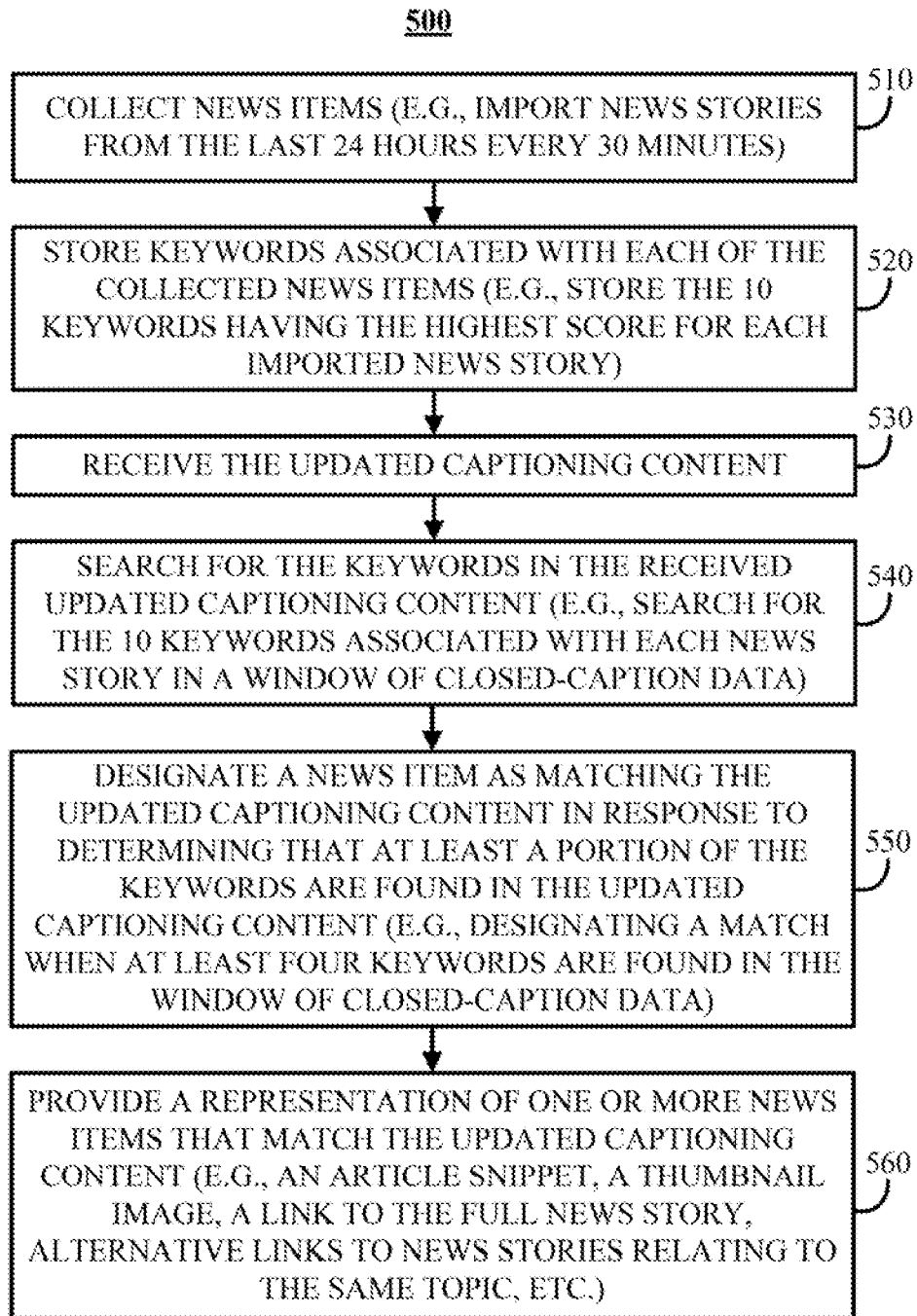
FIG. 5 shows an illustrative example of a process for designating a news item as matching the captioning content in accordance with some implementations of the disclosed subject matter.

Turning to FIG. 5, as shown at 510 and 520, the search system can access the news matching system that stores news documents within a particular period of time (e.g., the last twenty-four hours) in a cache or other suitable storage device and, for each of the news documents from the particular period of time, stores a particular number of keywords associated with each news document that appear most frequently.

At 530, in response to receiving updated captioning content at 530, the search system can perform a search for the stored keywords in the updated captioning content. For example, in response to receiving an updated sliding window of captioning content for each channel at 420 of FIG. 4, the updated captioning content can be transmitted to find matching news documents. This can be done, for example, by searching for the keywords associated with the currently stored news documents (e.g., the ten keywords associated with each of the news documents from the last twenty-four hours) in the updated captioning content (e.g., the W-second window of closed caption data).

At 550, a news item can be designated as matching the updated captioning content in response to determining that at least a portion of the keywords are found in the updated captioning content. For example, if at least four of the top ten keywords that are associated with a news item are found in the updated sliding window of captioning content (e.g., the W-second window of closed caption data), the corresponding news item can be designated as a matching news item. In some implementations, a representation of the one or more news items that match the updated captioning content can be provided at 560. For example, if a match is found at 550 (e.g., because at least four keywords associated with a news item are found in a window of captioning content), any suitable representation of that news item or news document can be obtained. For example, this can include a snippet of the news article, a thumbnail image of the news article, a URL to the full news article or news document, and/or URLs to news articles concerning the same or similar topic (e.g., a similar news article from a different source).

In a more particular example, important keywords (e.g., based on frequency) can be found in a corpus of news documents from multiple content sources and each of these important keywords can be searched for within updated captioning content to find matching news documents.

In some implementations, a timeline can be associated with each channel. For example, in response to finding a matching news item or news document based on the updated captioning content for a channel, the search system can generate and/or access a timeline associated with the channel. In particular, for a given channel, a matching news item or news document can be associated with a timestamp or time period indication that identifies the time that the corresponding media content occurred (e.g., portion of the television program that provides the news story).

As such, in response to receiving an audio sample or an audio fingerprint and identifying the corresponding channel, the search system or any other suitable system can access the timeline associated with the channel and return news documents (if any) that can be presented to the user. For example, the search system can determine the time associated with the audio sample or audio fingerprint (e.g., a recent time for a live, broadcasted television program, a time associated with recorded content stored on a digital video recorder, etc.) and determine whether news documents have been included on the timeline at or near the determined time. In a more particular example, when the media content is recorded content stored on a digital video recorder or video-on-demand content, the time associated with the audio sample or audio fingerprint can be used to determine the time offset within a program. In another more particular example, the time offset within the program can be determined by obtaining it from the video player, thereby allowing related news items to be loaded for that moment.

It should be noted that, in some implementations, the client application can continuously and/or periodically transmit an audio sample or any other suitable audio data relating to a television program being presented to the search system. In response, the client application can be provided with updated news items or news documents for selection.

It should also be noted that, in some implementations, the client application can continue to identify the channel that the user of the client application is tuned. For example, in response to changing from one channel to another, the client application can receive an updated audio sample and identify the channel based on the updated audio sample. In another example, the client application can continue to access a second screen application or a remote control application (e.g., at predetermined times) and identify the last channel that has been tuned to.

Figure 6:
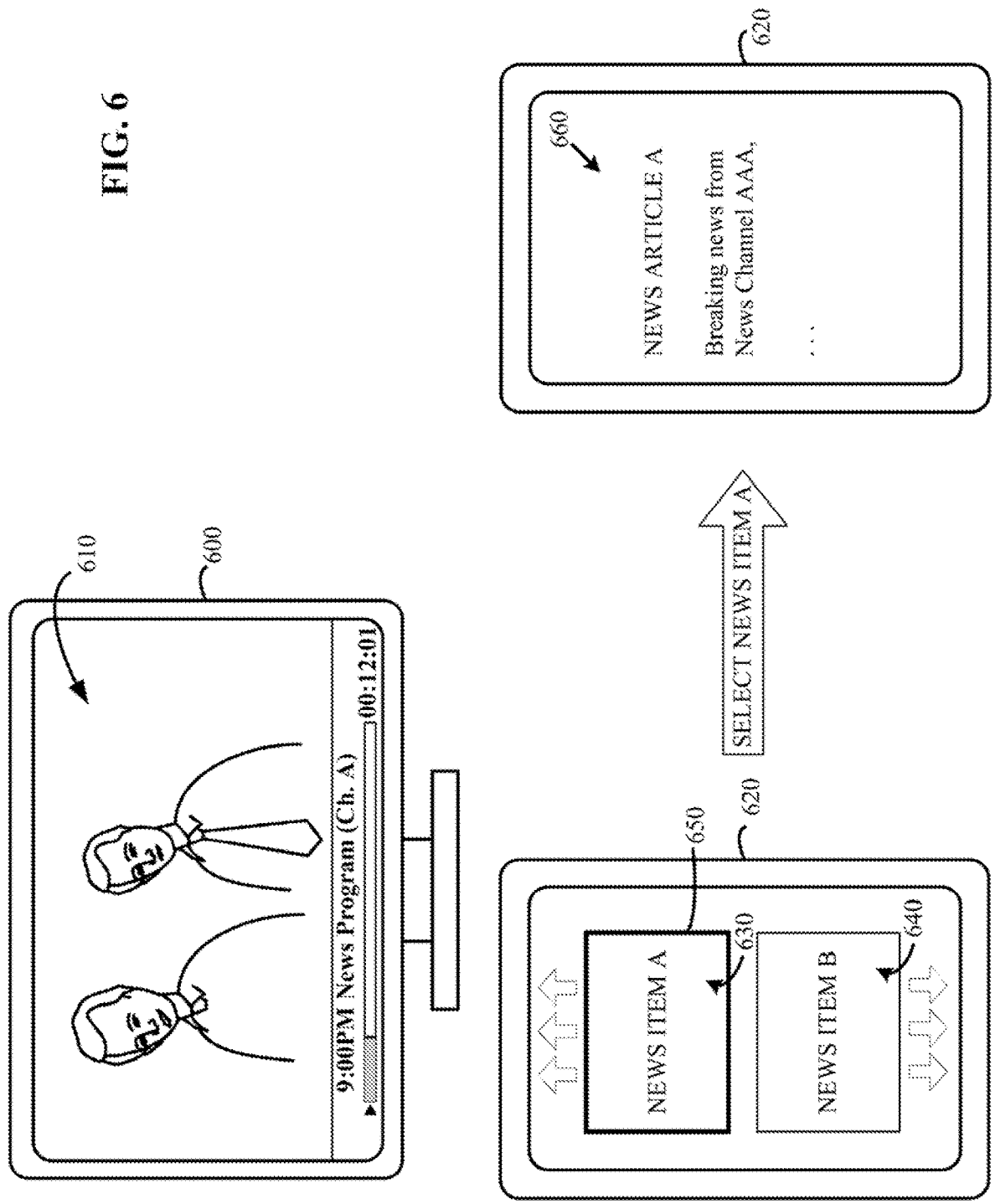
FIG. 6 shows an illustrative example of a device that is providing media content, such as a television program, and a mobile device that, upon initiation of the client application, provides news items relating to the television program, interfaces for selecting a news item, and a news document corresponding to a selected news item in accordance with some implementations of the disclosed subject matter.

FIG. 6 shows an illustrative example of a television device 600 displaying a television program or other suitable media content 610 and a computing device 620 displaying an interface for presenting and/or selecting one or more news items 630 and 640. As described above, news items 630 and 640 can include any suitable representation of a news document, such as a snippet of the news document, a thumbnail image of the news document, a link or uniform resource locator (URL) to the news document (e.g., a webpage having the full news article), one or more links or URLs to other news documents about the same topic (e.g., a similar article provided by a different news source, a follow-up article, a related article, etc.), etc.

In response to transmitting an audio sample corresponding to television program 610 provided on television device 600 (e.g., a generated audio fingerprint), a computing device 620 can process the audio sample to determine the channel corresponding to the audio sample. As described above, this can include comparing a generated audio fingerprint with audio fingerprints that are generated by capturing audio data from multiple channels and that are stored in an audio fingerprint database. The matching audio fingerprint can be used to identify the channel associated with the audio sample and, in turn, a timeline associated with the channel can be accessed to retrieve news items relating to the television program. As also described above, a channel can be identified using other suitable approaches, such as determining the last channel that has been tuned to by communicating with a second screen application or a remote control application. The channel can also be identified by prompting the user of the mobile device with a list of selectable channel identifiers and receiving a user-selected channel.

As described above, computing device 620, such as a second screen device, can be coupled to television device 600 (e.g., in communication with television device 600) or a device that is causing program 610 to be presented on television device 600, such as a set-top box or a digital media receiver. In some implementations, computing device 620 can be a stand-alone device that is not coupled to television device 600 or a device causing program 610 to be presented on television device 600 (e.g., a second screen device, such as a mobile telephone or a tablet computer, is in communication with the search server). As also described above, computing device 620 can be any computing device suitable for presenting the news items or other associated news content to a user, such as a smartphone, a tablet computer, a wearable computer, a heads-up display, a laptop computer, a personal computer (PC), a smart television, etc.

As shown, multiple news items 630 and 640 are presented to the user on a graphical user interface associated with the client application. It should be noted that the news items can be presented in any suitable manner—e.g., a scrollable list of article snippets where news items are presented one at a time, multiple news items can be presented at a time based on the size of the display of computing device 620, etc. For example, when the computing device is a second screen device having a large display, such as a tablet computing device, multiple news items can be presented in the graphical user interface. In another example, when the computing device is a smartphone, one news item can be presented at a time and the user can be provided with an option to navigate to another news item (e.g., using one or more gestures on a touch screen, pressing a suitable button on the smartphone, etc.).

In some implementations, the client application can indicate that a news item from the multiple news items has been selected by the user. For example, as shown in FIG. 6, a highlight region 650 can be placed around the selected news item to indicate the user selection. In another example, the client application can wait for a second action to indicate a selection of the highlighted news item, such as a swiping gesture on a touch screen or the user pressing a button.

In some implementations, in response to selecting a news item (e.g., News Item A), a news article corresponding to the selected news item can be presented to the user. In this particular example, news article 660 is displayed on a graphical user interface associated with the client application (e.g., a web browsing application that loads the URL associated with the news article).

Figure 7:
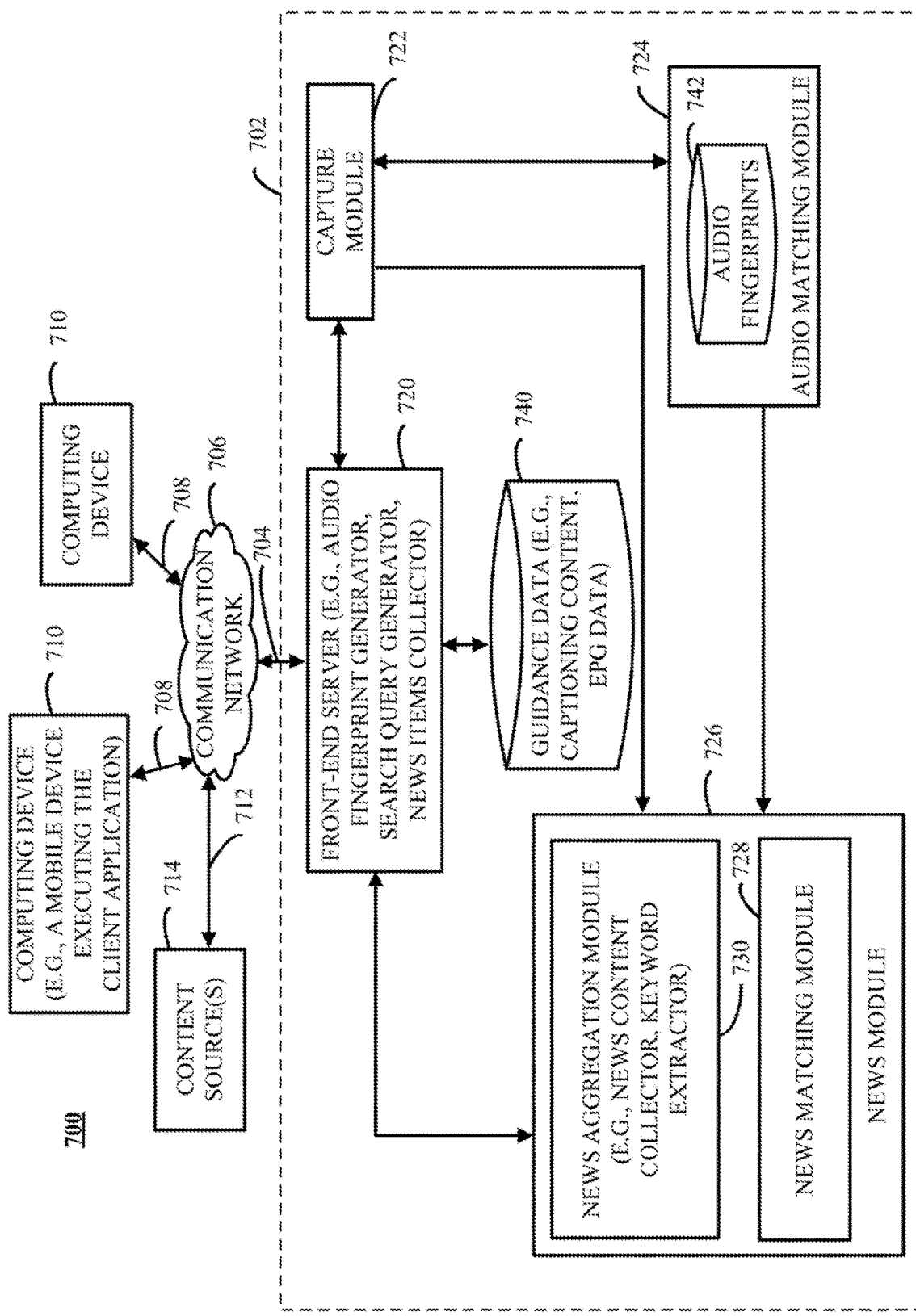
FIG. 7 shows a schematic diagram of an illustrative system suitable for implementation of the mechanisms described herein for providing news content, such as news items, corresponding to media content in accordance with some implementations of the disclosed subject matter.

Turning to FIG. 7, an illustrative example 700 of a generalized schematic diagram of a system on which the mechanisms for presenting news items based on media content is shown in accordance with some implementations of the disclosed subject matter. As illustrated, system 700 can include one or more computing devices 710. Computing devices 710 can be connected by one or more communication links 708 to a communications network 706 that can be linked via a communications link 704 to a server 702. In some implementations, computing devices 710 and server 702 can be linked via a communications link 712 to one or more content sources 714.

System 700 can include one or more servers 702. Server 702 can be any suitable server for providing access to the application, such as a processor, a computer, a data processing device, or any suitable combination of such devices. For example, the application can be distributed into multiple backend components and multiple frontend components and/or interfaces. In a more particular example, backend components, such as data collection and data distribution can be performed on one or more servers 702.

In some implementations, front-end components of the application (or a portion of the application), such as a user interface and/or channel identification features can be performed on one or more computing devices 710.

In some implementations, each of the computing devices 710 and server 702 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 710 can be implemented as a smartphone, a tablet computer, a wearable computer, a smart television, a set-top box, a digital media receiver, a game console, a personal computer, a laptop computer, a personal data assistant (PDA), a home entertainment system, any other suitable computing device, or any suitable combination thereof.

For example, in some implementations, a program can be presented using a first computing device 710, such as a smart television, a set-top box, a digital media receiver, etc., and supplemental content can be presented using a second computing device 710, such as a tablet computer, a smartphone, a wearable computer, a PDA, etc.

In some implementations, content source(s) 714 can be any suitable content sources, such as a cable (or telephone) television content source, a satellite television content source, an on-demand program content source, an over-the-top program content source, an Internet content source, a streaming program content source, any other suitable content source, or any suitable combination thereof.

In some implementations, communications network 706 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 704, 708, and 712 can be any communications links suitable for communicating data among computing devices 710, server 702, and/or content source(s) 714, such as network links, dial-up links, wireless links, hard-wired links, any other suitable communications links, or any suitable combination of such links. Computing devices 710 can enable use of the techniques described herein that can allow the features of the mechanisms to be used. Computing devices 710, server 702 and content source(s) 714 can be located at any suitable location.

In some implementations, server 702 can include one or more modules 720-730 and/or databases 740-742 that can be interconnected, for performing various functions of the application and/or facilitating the mechanisms for presenting news items based on media content information.

In some implementations, a front-end server module 720 can perform processes for presenting news items as described above in connection with, for example, FIGS. 1-5. For example, the front-end server can act as a proxy between the client application executing on computing device 710 and other server modules, such as capture module 722, audio matching module 724, and news module 726.

In some implementations, a capture module 722 can receive media data related to a program or a channel, such as video data, audio data, electronic program guide data, metadata, subtitles or captioning content, etc., as described above in connection with, for example, FIG. 1. Additionally or alternatively, capture module 722 can extract various media data from content provided from content sources as described in connection with, for example, FIG. 1. Such extracted media data can include, for example, audio fingerprints, subtitles, etc. This information can be stored, for example, in a database (not shown) for use by the search application executing on front-end server 720 in identifying channels, obtaining news items, and/or various other operations.

In some implementations, guidance data 740, such as an electronic program guide (EPG) database and a closed caption database, can be accessed. For example, front-end server module 720 can access guidance data 740 to obtain program information related to an identified channel or an identified program and use the program information to search for matching news items. It should be noted that, in some implementations, guidance data 740 can be provided from, for example, content source(s) 714.

In some implementations, an audio matching module 724 can receive audio fingerprint data for a program from capture module 722 and compare the received audio fingerprint data against stored audio fingerprint data in a fingerprint database 742. This fingerprint database can be used, for example, to identify a channel as described above, to determine a program that is being presented to a user, etc.

In some implementations, a news module 726 can find matching news items associated with a program provided by an identified channel using news aggregation module 730 and news matching module 728. For example, news aggregation module 730 can obtain news documents from multiple content sources (e.g., content sources 714) and aggregate or cluster news documents that relate to a particular topic or story. News aggregation module 730 can then rank each of the news documents by recency (e.g., recently published news articles, a difference between a time that the source published the news article and a time that the news event occurred, etc.), popularity (e.g., popularity based on click-through-rate), etc. In response to ranking the news documents, news aggregation module 730 can select at least one of the news documents from the clustered news documents for presenting to the user.

In some implementations, news aggregation module 730 can determine one or more keywords associated with the clustered news documents. For example, news aggregation module 730 can determine word or term frequency within a news document. In another example, news aggregation module 730 can determine the inverse document frequency associated with the keyword across all news documents.

In some implementations, news matching module 728 can obtain news documents within a particular period of time (e.g., the last twenty-four hours). For each of the news documents, news matching module 728 can obtain a particular number of keywords that are associated with each news document that appear most frequently (e.g., the ten most frequent keywords in the news document).

Upon receiving captioning content (e.g., from front-end server 720 and guidance data 740), news matching module 728 can perform a search for the keywords within the captioning content. A news item can then be designated as matching the captioning content in response to determining that at least a portion of the keywords are found in the captioning content. For example, if at least four of the top ten keywords associated with a news item are found in the sliding window of captioning content (e.g., the W-second window of closed caption data), the corresponding news item can be designated as a matching news item.

In some implementations, a timeline can be associated with each channel, where a matching news item or news document can be associated with a timestamp or time period indication that identifies the time that the corresponding media content occurred (e.g., portion of the television program that provides the news story).

In response to identifying the channel, front-end server can access the timeline associated with the channel and return news documents (if any) that can be presented to the user. In some implementations, a representation of the one or more news items that match the captioning content can then be provided. For example, the representation can include a snippet of the news article, a thumbnail image of the news article, a URL to the full news article or news document, and/or URLs to news articles concerning the same or similar topic (e.g., a similar news article from a different source).

It should be noted that, although modules 720-730 and databases 740-742 are shown as being included in server 702, these modules and/or databases can be provided in different servers in various combinations. For example, news module 726 can be provided on a first server and modules 720-724 can be provided on a second server. As another example, each module can be provided on a different server. It should be noted that these are merely examples, and the modules described can be organized in any suitable manner.

It should also be noted that modules 720-730 can be included as part of the application, can each be a separate application, or can be part of any other suitable application.

Figure 8:
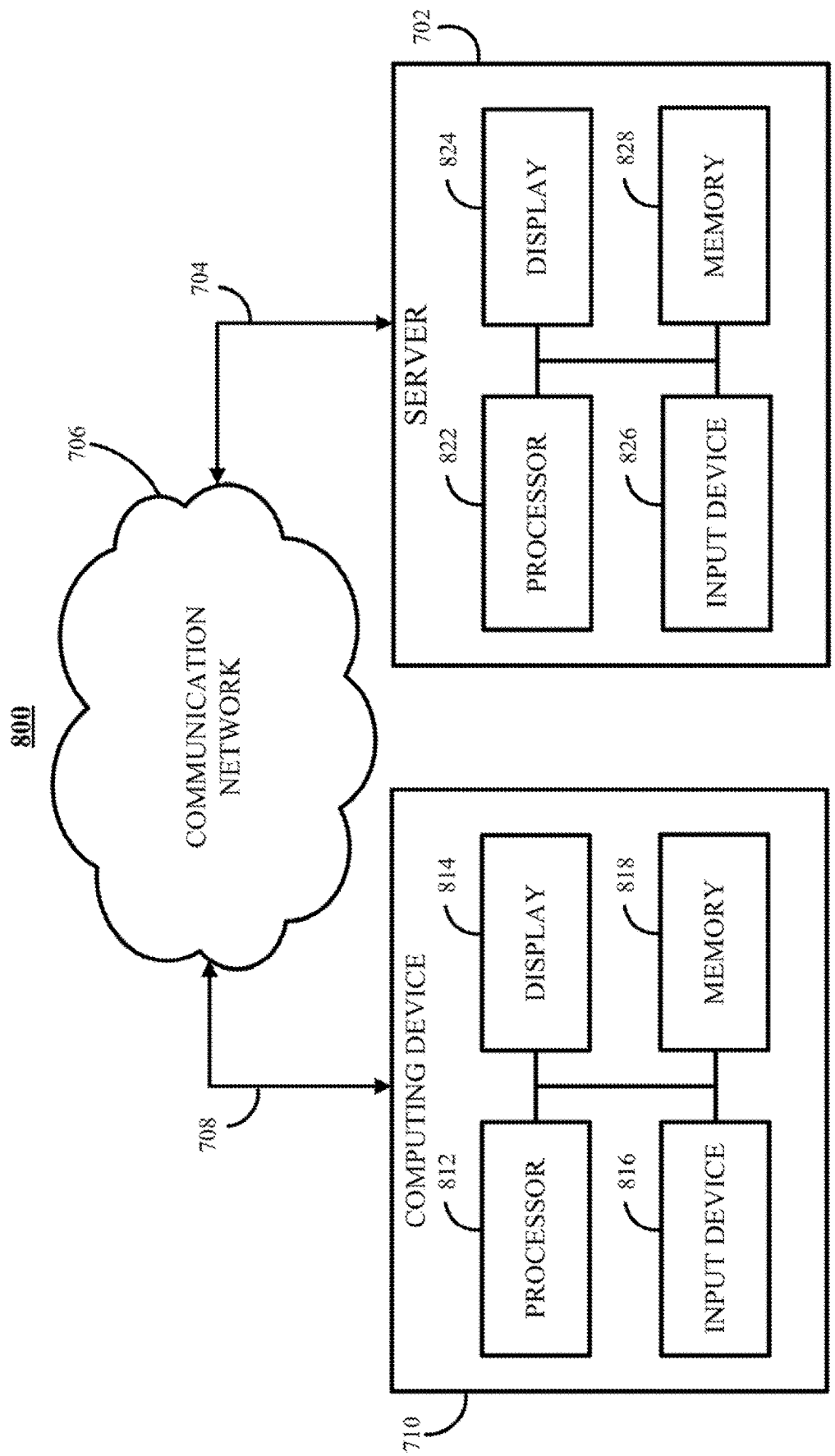
FIG. 8 shows a detailed example of a server and one of the computing devices of FIG. 7 that can be used in accordance with some implementations of the disclosed subject matter.

FIG. 8 illustrates an example 800 of hardware that can be used to implement server 702 and one of computing devices 710 depicted in FIG. 7 in accordance with some implementations of the disclosed subject matter. Referring to FIG. 8, computing device 710 can include a hardware processor 812, a display 814, an input device 816, and memory 818, which can be interconnected. In some implementations, memory 818 can include a storage device (such as a non-transitive computer-readable medium) for storing a computer program for controlling hardware processor 812.

Hardware processor 812 can use the computer program to present on display 814 content and/or an interface that allows a user to interact with the client application and to send and receive data through communications link 708. It should also be noted that data received through communications link 708 or any other communications links can be received from any suitable source. In some implementations, hardware processor 812 can send and receive data through communications link 708 or any other communication links using, for example, a transmitter, receiver, transmitter/receiver, transceiver, or any other suitable communication device. Input device 816 can be a computer keyboard, a mouse, a trackball, a keypad, a remote control, any other suitable input device, or any suitable combination thereof. Additionally or alternatively, input device 816 can include a touch screen display 814 that can receive input (e.g. using a finger, a stylus, or the like).

Server 702 can include a hardware processor 822, a display 824, an input device 826, and memory 828, which can be interconnected. In some implementations, memory 828 can include a storage device for storing data received through communications link 704 or through other links, and processor 822 can receive commands and values transmitted by one or more users of, for example, computing device 710. The storage device can further include a server program for controlling hardware processor 822.

The mechanisms described herein for providing news items and other news-related content based on media content can be implemented in computing devices 710 and/or server 502 as software, firmware, hardware, or any suitable combination thereof.

In some implementations, server 702 can be implemented as one server or can be distributed as any suitable number of servers. For example, multiple servers 702 can be implemented in various locations to increase reliability, function of the application, and/or the speed at which the server can communicate with computing devices 710.

In some implementations, the client application can include an application program interface (not shown), and/or can be resident in memory 818 of computing device 710 and/or memory 828 of server 702. Additionally or alternatively, a graphical user interface ("GUI") can be distributed to computing device 810, which can allow a user to interact with the client application resident at, for example, server 702.

In some implementations, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 510 and/or server 502 that is executing the application(s) (e.g., a program written in a programming language, such as, Java, C, Objective-C, C++, C #, Javascript, Visual Basic, HTML, XML, ColdFusion, any other suitable approaches, or any suitable combination thereof).

In some implementations, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for presenting news items corresponding to media content are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-5 can be executed or performed in any order or sequence not limited to the order and sequence shown and described in the figures. Also, some of the above steps of the processes of FIGS. 1-5 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method, the method comprising:
    determining, using a hardware processor, whether there are one or more content items that correspond to a media content item being presented by:
        retrieving captioning content that is associated with the media content item;
        generating a sliding window of captioning content that corresponds with a particular time period of the media content item;
        searching through the captioning content in the sliding window of captioning content for portions of the captioning content that contain one or more keywords extracted from the one or more content items to obtain a subset of content items;
        designating the subset of content items as matching the sliding window of captioning content based on a number of the one or more keywords found within the sliding window of captioning content being greater than a threshold number; and
        storing a timestamp that corresponds to the sliding window and the one or more content items; and
    causing, using the hardware processor, the subset of content items that correspond to the media content item to be presented based on the timestamp.

2. The method of claim 1, wherein the media content item is presented by a media device and wherein the subset of content items is presented by a mobile device.

3. The method of claim 1, further comprising:
    receiving audio data that is captured using a mobile device; and
    determining, in response to receiving the audio data, a content source that is providing the media content item based on the audio data.

4. The method of claim 3, wherein the content source is a channel that is providing one or more television programs.

5. The method of claim 3, wherein the audio data comprises an audio fingerprint corresponding to the media content item, and wherein the content source is determined based on the audio fingerprint.

6. The method of claim 5, wherein the content source is determined by comparing the audio fingerprint corresponding to the media content item with one of a plurality of stored audio fingerprints associated with a plurality of media content items.

7. The method of claim 1, further comprising:
    receiving additional captioning content corresponding to the media content item;
    updating the captioning content to updated captioning content by adding the additional captioning content and removing a portion of the captioning content;
    determining whether at least one of the one or more keywords associated with the one or more content items is included in the updated captioning content; and
    in response to determining that a content item matches the updated captioning content, storing the content item in a timeline associated with the media content item.

8. The method of claim 1, further comprising:
    determining a plurality of keywords associated with each content item in the one or more content items based on a frequency of a keyword within each content item; and
    determining whether at least one of the plurality of keywords associated with each content item in the one or more content items is included in the captioning content.

9. The method of claim 1, further comprising:
    retrieving the one or more content items;
    sorting the one or more content items into groups of content items based on topic information; and
    selecting a content item from each group of content items based on popularity information and timing information associated with a recency of the content item.

10. A system, the system comprising:
    a hardware processor that is configured to:
        determine whether there are one or more content items that correspond to a media content item being presented by:
            retrieving captioning content that is associated with the media content item;

generating a sliding window of captioning content that corresponds with a particular time period of the media content item;

searching through the captioning content in the sliding window of captioning content for portions of the captioning content that contain one or more keywords extracted from the one or more content items to obtain a subset of content items;

designating the subset of content items as matching the sliding window of captioning content based on a number of the one or more keywords found within in the sliding window of captioning content being greater than a threshold number; and storing a timestamp that corresponds to the sliding window and the one or more content items; and cause the subset of content items that correspond to the media content item to be presented based on the timestamp.

11. The system of claim 10, wherein the media content item is presented by a media device and wherein the subset of content items is presented by a mobile device.

12. The system of claim 10, wherein the hardware processor is further configured to:

receive audio data that is captured using a mobile device; and determine, in response to receiving the audio data, a content source that is providing a media content item based on the audio data.

13. The system of claim 12, wherein the content source is a channel that is providing one or more television programs.

14. The system of claim 12, wherein the audio data comprises an audio fingerprint corresponding to the media content item, and wherein the content source is determined based on the audio fingerprint.

15. The system of claim 14, wherein the content source is determined by comparing the audio fingerprint corresponding to the media content item with one of a plurality of stored audio fingerprints associated with a plurality of media content items.

16. The system of claim 10, wherein the hardware processor is further configured to:

receive additional captioning content corresponding to the media content item;

update the captioning content to updated captioning content by adding the additional captioning content and removing a portion of the captioning content;

determine whether at least one of the one or more keywords associated with the one or more content items is included in the updated captioning content; and in response to determining that a content item matches the updated captioning content, store the content item in a timeline associated with the media content item.

17. The system of claim 10, wherein the hardware processor is further configured to:

determine a plurality of keywords associated with each content item in the one or more content items based on a frequency of a keyword within each content item; and determine whether at least one of the plurality of keywords associated with each content item in the one or more content items is included in the captioning content.

18. The system of claim 10, wherein the hardware processor is further configured to:

retrieve the one or more content items;

sort the one or more content items into groups of content items based on topic information; and select a content item from each group of content items based on popularity information and timing information associated with a recency of the content item.

19. A non-transitory computer-readable medium containing computer executable instructions that, when executed by a processor, cause the processor to perform a method, the method comprising:

determining whether there are one or more content items that correspond to a media content item being presented by:

retrieving captioning content that is associated with the media content item;

generating a sliding window of captioning content that corresponds with a particular time period of the media content item;

searching through the captioning content in the sliding window of captioning content for portions of the captioning content that contain one or more keywords extracted from the one or more content items to obtain a subset of content items;

designating the subset of content items as matching the sliding window of captioning content based on a number of the one or more keywords found within the sliding window of captioning content being greater than a threshold number; and storing a timestamp that corresponds to the sliding window and the one or more content items; and causing the subset of content items that correspond to the media content item to be presented based on the timestamp.

* * * * *